May 22, 1962     B. A. WYMAN ET AL     3,035,802
POLE TOP ADAPTER FOR STREETLIGHTING TRANSFORMER
Filed March 13, 1958     3 Sheets-Sheet 1
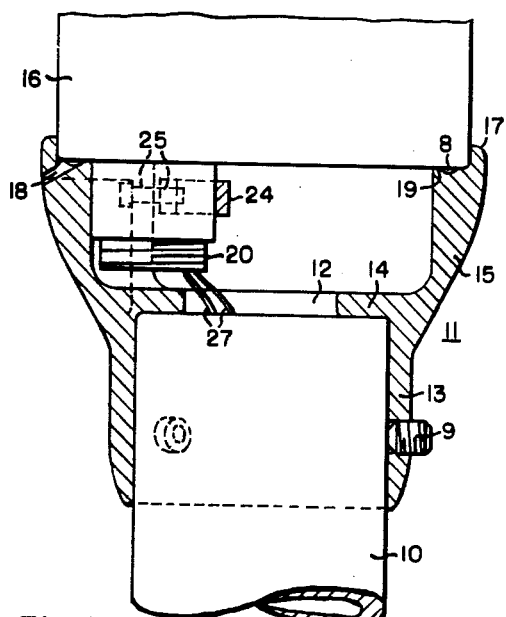
Fig. 1.
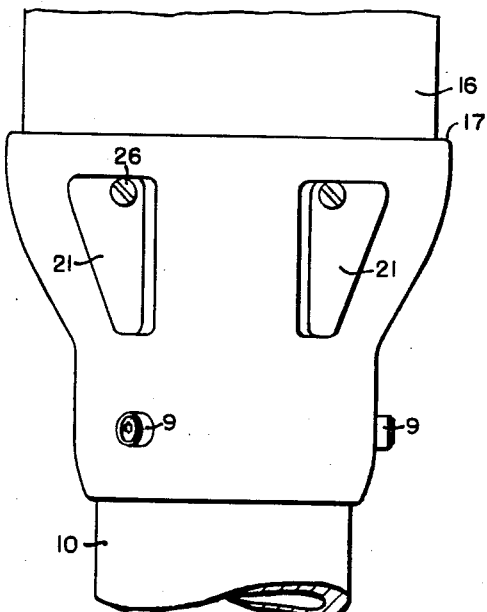
Fig. 2.
Fig. 3.
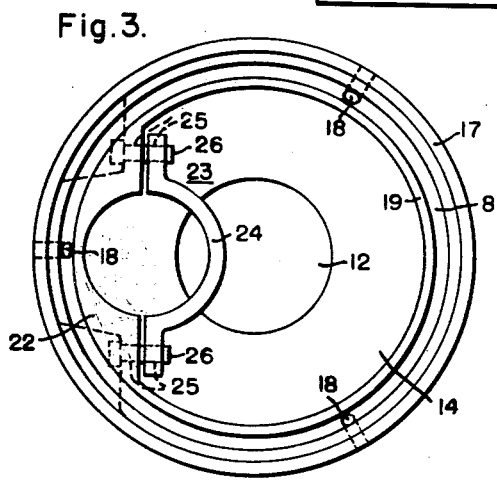
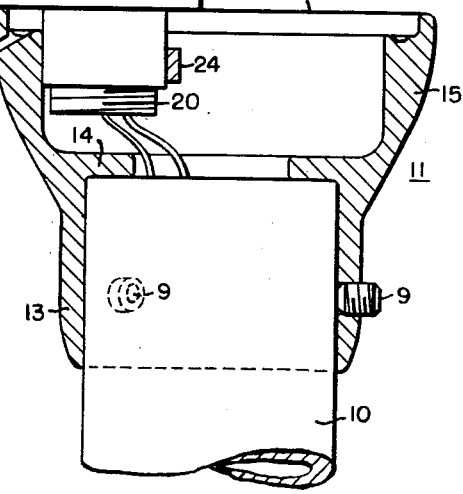
Fig. 4.
WITNESSES
John E. Healy, Jr.
James F. Young
INVENTORS
Burton A. Wyman &
Claude H. Burns
BY
Arthur T. Stratton
ATTORNEY May 22, 1962 B. A. WYMAN ET AL 3,035,802
POLE TOP ADAPTER FOR STREETLIGHTING TRANSFORMER
Filed March 13, 1958 3 Sheets-Sheet 3

United States Patent Office 3,035,802
Patented May 22, 1962

3,035,802
POLE TOP ADAPTER FOR STREETLIGHTING TRANSFORMER

Burton A. Wyman, Cleveland, and Claude H. Burns, Lakewood, Ohio, assignors to Westinghouse Electric Corporation, East Pittsburgh, Pa., a corporation of Pennsylvania
Filed Mar. 13, 1958, Ser. No. 721,279
6 Claims. (Cl. 248—229)

The invention relates generally to an adapter for mounting lighting transformers on poles, and more particularly to adapters for mounting transformers to be utilized for streetlights on streetlight standards.

It has been the practice in mounting lighting equipment on poles and standards to employ adapters which during installation operations have to be supported at the top of the pole by equipment ordinarily furnished to workmen. Sometimes transformers that have to be mounted in conjunction with streetlights have to be retained at the top of the pole by chaining them to the pole top adapter or other supporting means while the electrical connections are being made. This is difficult and often results in expensive breakage of parts.

One object of the invention is to provide an adapter for mounting transformers on streetlighting poles which can support the transformer in such position relative to the adapter that easy access may be had to the transformer leads for making electrical connections.

It is also an object of the invention to provide in an adapter clamping means for retaining the transformer in position which may be tightened or loosened from outside the adapter when the transformer and other members are assembled.

Other objects of the invention will in part be obvious and will in part appear hereinafter.

The invention accordingly comprises the features of construction, the combination of elements and arrangement of parts, which will be exemplified in the construction hereinafter set forth and the scope of the application of which will be indicated in the claims.

For a fuller understanding of the nature and objects of the invention, reference should be had to the following detailed description, taken in connection with the accompanying drawing in which:

FIGURE 1 is a view partly in section and partly in side elevation of an adapter embodying the features of the invention;

FIG. 2 is a view in side elevation showing features of the invention;

FIG. 3 is a top plan view of the adapter;

FIG. 4 is a view partly in section and partly in side elevation showing how the adapter may be utilized to support the transformer extending over the edge of the adapter to give access to the transformer leads for making electrical connections;

Figure 5:
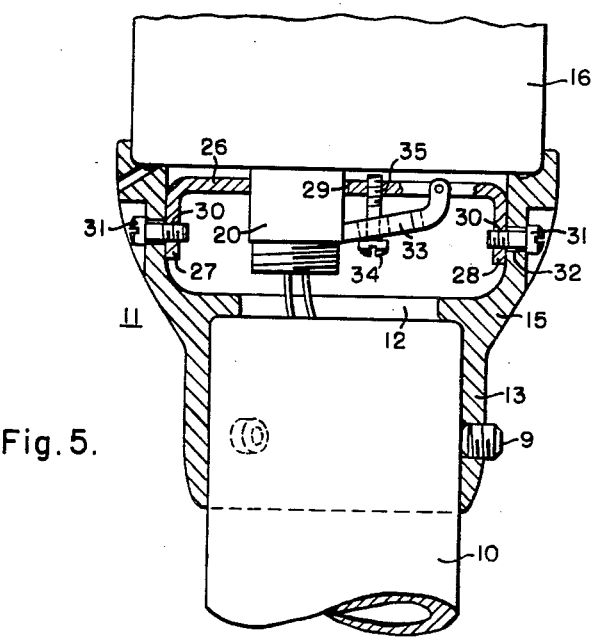
FIG. 5 is a view in section taken along the lines V—V in FIG. 6.

Referring now to the drawing and FIG. 1 in particular, a lighting standard or pole 10 is illustrated with an adapter shown generally at 11 mounted thereon. The adapter 11 is bowl-shaped with an opening 12 extending therethrough.

The lower end of the adapter simulates a sleeve 13, the inside diameter of which is only slightly larger than the outside diameter of the pole 10. Therefore, when the adapter is mounted on the pole, the lower end or sleeve portion 13 fits relatively tightly over the upper end of the pole and is clamped in position by the set screws 9. When the sleeve extends downwardly far enough over the pole, it will, when the set screws 9 are tightened, firmly hold the adapter in position under all circumstances.

In this particular embodiment of the invention, the sleeve is approximately half of the total length of the adapter. At the upper end of the sleeve there is an annular member 14 formed integrally with the adapter wall. This annular member 14 seats on the upper end of the pole. It also greatly strengthens the adapter.

The upper end 15 of the adapter 11 flares outwardly to give the top of the bowl-shaped member 15 of the adapter 11 a greater diameter than the lower end. The upper end is further flared outwardly to make it large enough to receive the transformer 16 which usually has a greater diameter than pole 10. Further, the upper end 15 of the bowl-shaped member should be large enough to enable the provision of a rim 17 which fits around the outside of the transformer 16. The rim 17 need not be high, but sufficient to facilitate the firm seating of the transformer 16 in a predetermined position on the pole.

It will be observed that the rim 17 extends outside of the transformer, and that it may catch rain and snow since these adapters are exposed to the elements. In order to prevent any accumulation of water, a circumferential groove 8 is provided between the shoulder 19 and rim 17. Openings 18 extend from the circumferential grooves 8 at the bottom of the rim 17 to the outside of the adapter 11. The openings 18 are sloped downwardly in order to assure the quick drain-off of the water to the outside.

When the transformer 16 is mounted in the adapter 11, it fits snugly inside the rim 17 and seats on the shoulder 19. In order to retain the transformer 16 in position, anchoring means are provided for clamping it to the adapter 11. In manufacturing the transformer, provision has to be made for bringing the leads (not shown) out of the transformer case. In this particular embodiment of the invention, a nipple 20 is disposed in the bottom of the transformer case and depends a predetermined distance. As shown, when the transformer is mounted in the adapter, the nipple 20 does not reach the annular member 14.

Many types of clamping or anchoring devices may be provided for holding the transformer in position in the adapter. In this particular embodiment, a pair of spaced indentations 21 are formed in the sidewall of the adapter at one side. The distance the indentations, best shown in FIG. 3, extend into the adapter will depend on design requirements. As shown, the wall of the adapter appears to be disposed inwardly a distance equal to about one quarter of the adapter diameter. If the adapter is cast, there will be enough metal provided between the indentations 21 which are shown disposed in alignment with one another to enable the forming of a section 22 of a clamp or anchoring member shown generally at 23. The outer section 24 of the clamp will be made the complement of the section 22. Aligned openings 25 will be provided in the sections 22 and 24 of the clamp 23. These openings will extend through the wall of the adapter 11 opening into the indentations 21.

The sections 22 and 24 of the clamp 23 may be drawn together in any well-known manner. In this embodiment of the invention the openings 25 in the section 24 of the clamp are threaded to receive screw bolts 26. Access may be had to the screw bolts in the indentations 21 to tighten or loosen the clamp from the outside. The clamp shown generally at 23 will be made the proper size to receive the nipple 20 depending from the transformer 16. When the transformer is being placed in position in the adapter 11, the nipple 20 may be fitted through the clamp 23 if the latter has been loosened slightly.

In order to gain access to the leads 27, the transformer 16 will be raised, then rotated around the axis of the nipple 20 carrying it into the position shown in FIG. 4. The transformer 16 now rests on the rim 17, and the clamp will hold it firmly in this position. After the electrical connections have been made, the transformer will be rotated back to its position above the adapter 11 and dropped inside of the flange 17 as shown in FIG. 1. The screw bolts 26 will now be tightened and the transformer firmly clamped in position in the adapter.

It has been suggested in the specification that the adapter will preferably be cast and this has been the usual practice. However, it will be readily appreciated that it can be made by other well-known shop practices. In fact, it could even be made from material other than iron or steel.

In the modification of the invention illustrated in FIG. 5, the adapter shown generally at 11 is mounted on the pole top in the manner described hereinbefore. The transformer or ballast 16 with its depending nipple 20 for the transformer leads is seated in the adapter.

In order to retain the transformer 16 in position in the adapter, an anchor or clamping member 65 is provided in the upper end of the aadpter 11. This anchoring member 65 comprises a plate provided wih an opening 29 and depending ends 63 and 28. The overall length of the anchoring mmeber 65 will be such that it will snugly fit inside the bowl member 15 of the adapter 11. The opening 29 provided in the top plate of the member 65 will be large enough to receive the nipple 20 of the transformer. Openings 30 will be provided in the depending arms 63 and 28 for receiving screw bolts 31 which extend through openings 32 provided in the bowl 15.

It will be noted that the opening 29 is not in the center of the anchoring member 65. It is disposed closer to one end than the other. The purpose of this is to permit the raising of the transformer 16 above the flange 17 provided on the bowl 15 and the rotation of it about the axis of nipple 20 to a position to give access to the bowl for the making of electrical connections between the transformer leads and the transmission lines (not shown) provided for supplying current to the transformer. When the anchor member 65 is attached to the bowl 15 by screw bolts 31, it will maintain the transformer 16 in position even when it is rotated to any position around the axis of the nipple 20.

When the transformer leads extending downwardly through the nipple 20 have been connected to the transmission lines and the transformer seated in the bowl 15, it may be locked to the anchoring member 65 by means of a hinged dog 33 that is drawn into tight engagement with the nipple 20 by means of the screw bolt 34 which engages in the threaded opening 35 provided in the anchoring member 65. When the dog 33 is drawn upwardly by the screw bolt 34, it engages the side of the nipple and in conjunction with the anchor member 65 locks the transformer against upward movement.

Figure 6:
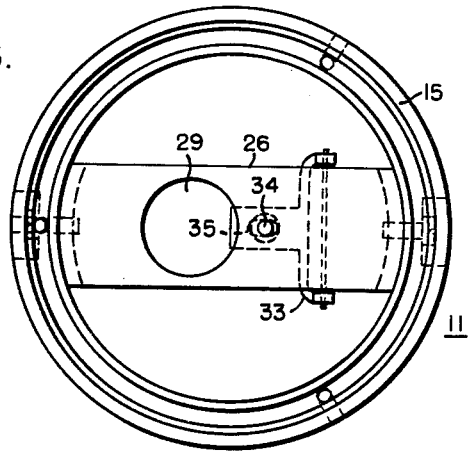
FIG. 6 is a top plan view showing features of a modified anchoring member.

In the modification shown in FIGS. 5 and 6 and described hereinbefore, the anchoring member 65 is mounted in the bowl 15 of the adapter 11. The anchoring member might also be mounted in the pole 10 if the nipple 20 is made longer and the opening 12 in the bottom of the bowl made slightly larger. All this can be accomplished by anyone skilled in the art by following the teachings of the specification.

Figure 7:
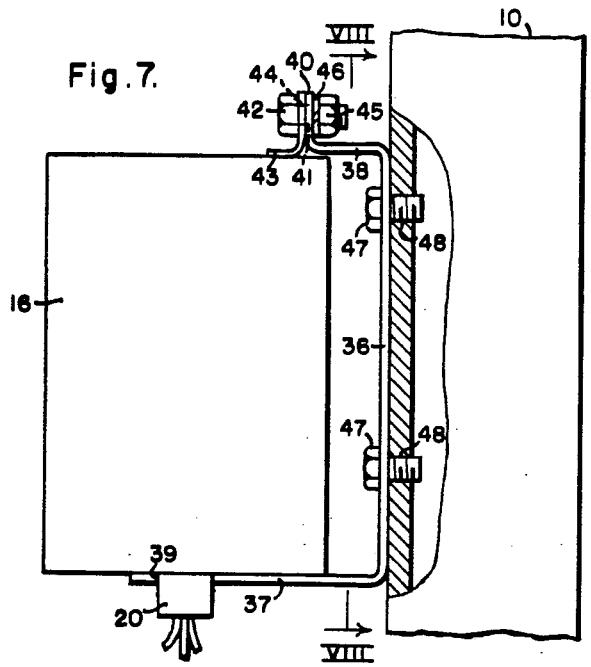
FIG. 7 is a view partly in section and partly in side elevation showing a modification of the adapter that may be mounted on the side of a pole.

Referring now to FIG. 7, the adapter comprises a strap 36 provided with two laterally extending arms 37 and 38. The lower arm 37 has an opening 39 provided therein which is large enough to fit over the depending nipple 20 of the transformer 16.

The upper arm 38 has the end portion 40 turned at right angles thereto to extend parallel to the main portion of the strap 36. As shown in FIG. 7, the member 40 is vertical, extending substantially parallel to the pole 10 and is provided with an opening 41 for receiving a bolt 42.

An angle member 43 is welded or otherwise secured to the top of the case of the transformer 16. In this particular modification, the angle member 43 is shown welded to the transformer case since it does not necessitate putting openings in the case which might permit the entrance of water or some deleterious matter. However, in the process of manufacture it would be possible to attach the angle member 43 by bolts, provided proper gaskets are employed to prevent the entrance of water.

As shown, the upwardly extending arm of the angle member 43 is about the same length as the end portion 40 of the strap 36. It will be provided with an opening 44 for receiving the bolt 42. This opening 44 will be aligned with the opening 41 in the member 40.

In applying the strap 36 to the transformer 16, the nipple 20 will be fitted through the opening 39 in the lower arm 37. The openings 41 and 44 in the members 40 and 43 respectively will be aligned and the bolt 42 inserted. In order to prevent any possibility of the nut 45 loosening and dropping off, a lock washer 46 will be provided between the member 40 and the nut 45 of the bolt 42.

Figure 8:
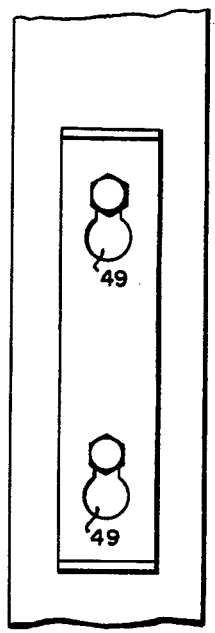
FIG. 8 is a view taken along the line VIII—VIII of FIG. 7 showing how the adapter is mounted on the pole.

In order to attach the adapter shown in FIGS. 7 and 8 to the pole 10, screw bolts 47 are mounted in threaded openings 48 provided in the pole 10 at the height at which it is desired to mount the transformer. The openings 48 in the pole 10 preferably will be drilled and threaded in the shop prior to the shipping of the pole to the location where it is to be erected. These openings 48 will be drilled in accordance with specifications submitted and will depend on the size of the adapter to be employed. However, for specific jobs the openings 48 may be drilled and threaded in the field.

The adapter strap 36 will have two openings 49 provided therein and spaced from one another a distance equal to the spacing of the screw bolts 47 as shown in FIG. 8. The openings 49 will be specially prepared depending on the size of the screw bolts employed. The lower portion of each opening will be large enough to fit over the head of the screw bolts 47. The upper portion of the openings 49 will only be the width of the shank of the screw bolt 48.

In mounting a transformer equipped wtih this type of adapter, the transformer will be raised to align the openings 49 in the strap 36 with bolts 47 and the strap fitted over the bolt heads and lowered to the position shown in FIG. 7. The edges of the strap 36 defining the narrow portion of the openings 49 will seat back of the heads 47 of the screw bolts 48. The screw bolts will be tightened with a wrench to firmly engage the strap 36, locking it in position on the pole.

Figure 9:
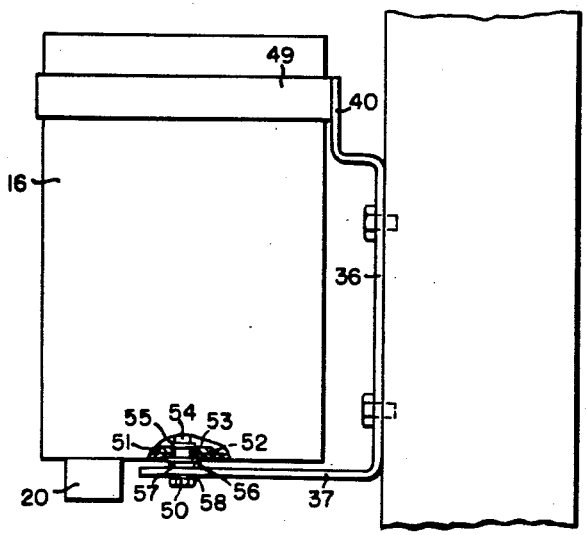
FIG. 9 is still another modification of an adapter for mounting the transformer on the side of a pole.

The adapter illustrated in FIG. 9 comprises a strap 36 quite similar in shape to the strap shown in FIGS. 7 and 8. It is provided with openings 49 for fitting over the heads 47 of the screw bolts 48 provided for mounting the adapter on a pole 10. The transformer will be hung on the pole in the same manner as described for the adapter shown in FIG. 7.

In order to attach the adapter strap 36 to the transformer, a ring 49, which may be readily slid over the transformer case from the lower end to the top, as shown in FIG. 9 is provided. The upper end 40 of the adapter strap is welded to the ring 49. The lower arm 37 of the adapter is made about the same length as in the modification shown in FIG. 7 and is provided with an opening for receiving a screw bolt 50. In this modification of the invention the nipple 20 of the transformer does not fit through an opening in the arm 37 but is disposed near the cylindrical wall of the transformer case.

In order to strengthen the lower end of the transformer case 16 for receiving the screw bolt 50, a plate 51 is welded thereto and on the inside. The size of the plate 51 will depend on the conditions to be met. In this particular embodiment the plate 51 is somewhat thicker than the case and may be attached thereto in any suitable manner as by riveting or welding. A weld 52 is shown since this is one of the easiest ways of attaching the plate 51 to the case.

An opening 53 will be provided in the transformer case and plate 51 and made large enough to receive a cylindrical socket member 54 having an internal thread opening adapted to receive the screw bolt 50. In making the socket 54 it will be provided with a raised ring-shaped member 55 which will not pass through the opening 53 in the plate 51.

It will be observed that the lower end of the socket member 54 is long enough to extend through the plate 51 and the wall of the case of the transformer 16 and protrude a distance substantially less than the thickness of the gasket 56. The gasket 56 is disposed over the socket member 54 and seats against the case of the transformer 16. Next to the gasket 56 is a washer 57 which serves to space the arm 37 of the adapter a predetermined distance from the transformer case.

In attaching the adapter to the lower end of the transformer case, a lock washer 58 is mounted on the screw bolt 50. When the screwbolt is screwed into the socket 54, it will compress the gasket 56. Further, the washer 58 will lock the screw bolt to prevent any possibility of its coming loose.

The adapters shown in FIGS. 7, 8 and 9 may be made from different materials. They are preferably made from sheet steel, which metal has adequate strength and if properly finished will give a long life.

Since certain changes may be made in the above construction and different embodiments of the invention could be made without departing from the scope thereof, it is intended that all matter contained in the above description or shown in the accompanying drawing shall be interpreted as illustrative and not in a limiting sense.

We claim as our invention:
1. An adapter for mounting a transformer or the like provided with leads on a pole, said adapter comprising, in combination, a support member having an opening therethrough for the transformer leads, indentations formed in said support member in a predetermined relationship to one another, one portion of a clamping member being integrally formed on and within the support member between the indentations, another portion of said claimping member being formed for cooperative relationship with said one clamping portion, aligned openings provided in said clamping portions, the aligned openings in said clamping portions opening into the indentations, and means for drawing said clamping portions together, said drawing means extending through the openings in said clamping portions, a member depending from the transformer providing a conduit for the leads, said depending member when loosely mounted between said clamping portions being enabled to move vertically and pivotally but substantially not otherwise laterally of said support members, whereby said transformer can be moved vertically and outwardly of and pivoted about the axis of said depending member so as to be supported in a position which gives access to the transformer leads in said support member opening.

2. An adapted for mounting a transformer or the like provided with leads on a pole, said adapter comprising, in combination, a support member having an opening extending therethrough, the lower end of said support member being generally in the form of a sleeve which fits over the pole and being otherwise formed to retain said support member on said pole, the upper end of said support member being formed to receive said transformer, a flange being provided on said upper end of said support member to provide lateral support for said trainsformer, said upper end having openings extending from inside said flange to the outside of said support member to provide drainage, a tubular member depending from the bottom of said transformer and being employed as a conduit for the leads, clamping means being carried by said support member for receiving said depending member, said clamping means being adjustable to enable said depending member to be moved vertically and pivotally but substantially not otherwise laterally of said support member, said transformer thus being movable vertically and outwardly of said support member to be laterally free of said flange and to be pivotable relative to the axis of said depending member into a supported position which gives access to the transformer leads in said support member opening.

3. An adapter for mounting a transformer or the like on a pole, said adapter comprsing, in combination, an elongated hollow support member having an opening through its lower end, said lower end of said support member being formed to seat on and engage the pole and the upper end of said support member being open and otherwise formed to receive said transformer against lateral displacement and over said opening, a depending member being provided on said transformer and extending inwardly of said support member, and means externally secured to said support member for engaging said depending member to retain said transformer on said support member, said engaging means being adjustable to enable said depending member to be moved vertically and pivotally but substantially not otherwise laterally of said support member, said depending transformer portion and said engaging means being offset from a centrally located reference line through said support member opening so as to enable said transformer to be partially withdrawn from said support member and pivoted to a supported position providing access to said support member opening.

4. An adapter for mounting a transformer or the like on a pole, said adapter comprising, in combination, an elongated hollow support member having an opening through its lower end, said lower end of said support member being generally in the form of a sleeve which fits over the pole and being otherwise formed to retain said support member on the pole, the upper end of said support member being open and otherwise formed to receive said transformer against lateral displacement and over said opening, a depending portion being provided on said transformer and extending inwardly of said support member and being employed as a conduit for leads from the transformer, means being externally secured to said support member for receiving said depending portion and clamping it to retain said transformer in a predetermined position, said receiving and clamping means being adjustable to enable said depending portion to be moved vertically and pivotally but substantially not otherwise laterally of said support member, and a flange being included on said upper end of said support member to provide lateral support for said transformer, said depending transformer portion and said receiving and clamping means being offset from a centrally located reference line through said support member opening so as to enable said transformer to be moved vertically outwardly of said support member to be laterally free of said flange and to be pivotable about the axis of said depending portion so as to be supported in a position providing access to said support member opening.

5. An adapter for mounting a transformer or the like provided with leads on a pole, said adapter comprising, in combination, a support member, means for mounting said support member on the pole, said support member having an opening therethrough and being formed to receive said transformer against lateral displacement and over said opening, a portion depending from said transformer and extending inwardly of said support member and being employed as a conduit for the transformer leads, an anchor member having an opening therethrough for receiving said depending portion, means for externally securing said anchor member to said support member inwardly of said transformer, means for locking said depending portion to said anchor member, said locking means being so formed and so located relative to said support member opening as to enable said transformer to be partially withdrawn from said support member and to be pivotable about its depending portion axis relative to said anchor member to a supported position providing access to said support member opening.

6. An adapter for mounting on a pole a device having a depending portion, said adapter comprising a support member having an opening therethrough, means for holding said support member on said pole, means forming a part of said support member for engaging said device over said opening against lateral and gravitational forces, said depending portion extending inwardly of said support member, and means for clamping said depending portion so as to support rigidly said device, said clamping means being externally secured to said support member and being adjustable so as to enable said depending portion to be moved vertically and pivotally but substantially not otherwise laterally of said support member, said device when sufficiently moved vertically and outwardly of said support member being free of the lateral restraint of said engaging means and said depending portion and said clamping means being so located relative to said support member opening as to enable said device to be pivotable to a support position providing access to said support member opening.

References Cited in the file of this patent

UNITED STATES PATENTS

| | | |
|---|---|---|
| 150,383 | Willging | Apr. 28, 1874 |
| 1,213,865 | Gunn | Jan. 30, 1917 |
| 1,288,752 | Thordarson | Dec. 24, 1918 |
| 1,295,823 | Osborn | Feb. 25, 1919 |
| 2,077,328 | Kelly | Apr. 13, 1937 |
| 2,427,770 | Ellinwood | Sept. 23, 1947 |
| 2,550,001 | Button | Apr. 24, 1951 |
| 2,642,250 | Kasnowich | June 16, 1953 |
| 2,899,690 | Clifford | Aug. 18, 1959 |

FOREIGN PATENTS

| | | |
|---|---|---|
| 685,159 | France | Mar. 25, 1930 |